No. 733,485. PATENTED JULY 14, 1903.
C. ILGNER.
MEANS FOR THE CONTROL OF THE ELECTRICAL DRIVING OF
REVERSIBLE ROLLING MILLS.
APPLICATION FILED JUNE 25, 1902.
NO MODEL.
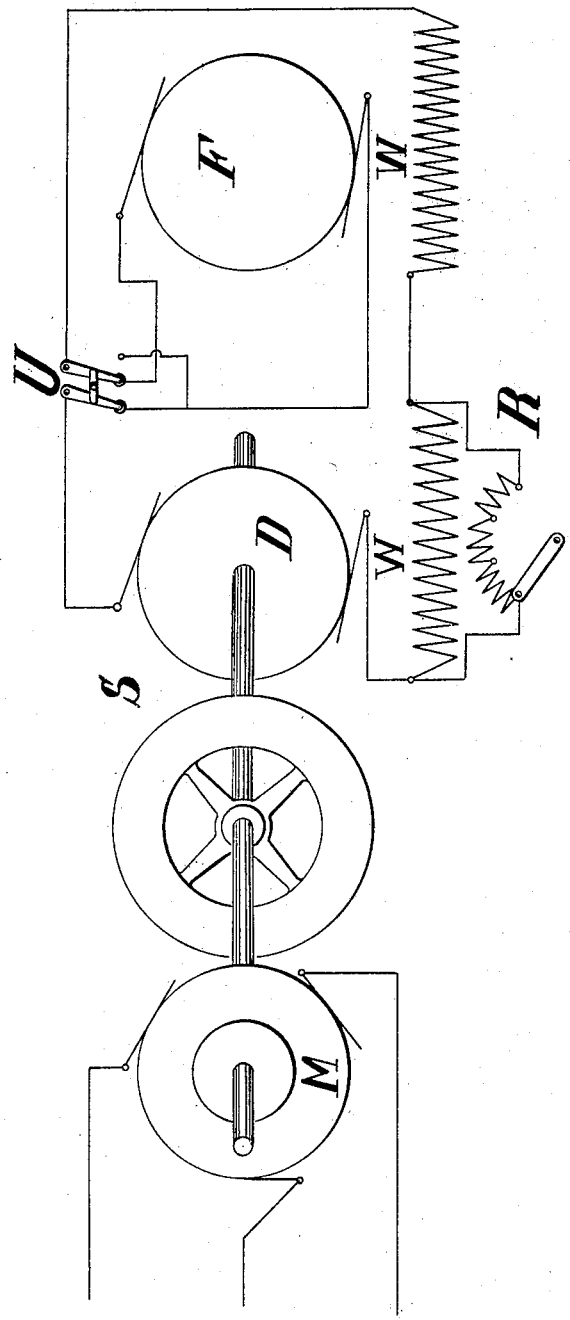
Attest:
C. Middleton
Edward Santon
Inventor,
Carl Ilgner.
by Ellis Spear.
Atty.

No. 733,485. Patented July 14, 1903.

UNITED STATES PATENT OFFICE.

CARL ILGNER, OF BRESLAU, GERMANY.

MEANS FOR THE CONTROL OF THE ELECTRICAL DRIVING OF REVERSIBLE ROLLING-MILLS.

SPECIFICATION forming part of Letters Patent No. 733,485, dated July 14, 1903.

Application filed June 25, 1902. Serial No. 113,182. (No model.)

*To all whom it may concern:*

Be it known that I, CARL ILGNER, a subject of the German Emperor, residing at Breslau, in the Empire of Germany, have invented certain new and useful Improvements in Means for the Control of the Electrical Driving of Reversible Rolling-Mills, of which the following is a specification.

This arrangement for electrical driving of reversible rolling-mills has for its object the reduction of the fluctuations of current caused at the source of supply by the switching in of the motor and to allow of the frequent changing of the direction of rotation and of the velocity of rolling in an economical manner. In order to obtain these objects, the current is not delivered directly to the rolling-mill motor, but by the intercalation of a motor-dynamo, which is to be connected with suitable flying masses. This combination of motor-dynamo is in operation as long as rolling is to be carried on.

The accompanying drawing shows the combination of the necessary machines in diagram.

The substitute motor M is directly connected with the source of current by means of cables and is of such a construction that its highest number of revolutions is limited, so that the motor cannot "race," and that with an increase of load the number of revolutions is reduced. This motor is connected with a dynamo is a solid way, which is to be constructed in such a manner that any change in the excitation causes an alteration in the difference of potential at the terminals of the dynamo. The starting of the rolling-mill motor F and its being brought to the desired number of revolutions is then to be effected by excitation and variation of excitation of its field-magnet. Between the dynamo D and the substitute motor M flying masses S are intercalated, the energy of which is to be used by changing their number of revolutions. If now the dynamo D of the intercalated motor-dynamo requires mechanical power in order to deliver electrical energy to the rolling-mill motor F, the motor M is prevented from taking this extra requirement of current directly from the source of supply of the main current in the form of electrical energy, the flying masses S preventing it from reducing its number of revolutions; but this extra requirement is first covered by the mechanical energy stored up in the flying masses. The motor M is only loaded after the number of revolutions of the flying masses S has been reduced and these latter have delivered a part of the power required by the intermediate dynamo D. The electrical energy is therefore taken off gradually from the source of current. If the demand of mechanical power required by the dynamo D decreases, the motor M drives the flying masses S up to the number of revolutions corresponding to its running without load, and thus again stores up power in the flying masses.

In the drawing, W represents the field-magnet coils of the dynamo D and of the chief motor.

R is a regulator serving to determine the difference of potential at the terminals of the dynamo D, and U is a switch for changing the direction of revolutions of the motor F.

If the rolling-mill motor and the dynamo D, appertaining thereto, are constructed as continuous-current shunt-machines, a quick arrest of the rolling-mills is rendered possible by the difference of potential at the terminals of the dynamo D being reduced by means of the regulator R as to be smaller than that of the motor F. Thereby the rolling-mill motor F works as a dynamo on the dynamo D, acting as a motor, and brakes itself.

What I claim, and desire to secure by Letters Patent of the United States, is—

The herein-described arrangement for regulating the velocity of electrically-driven reversible roller-mill motors without the use of resistances to be switched in and for effecting a gradual taking off of current from the main-current source, said demand of current not rising to the full amount of current consumption corresponding to the work required by the rolling-mill motor on starting and on running, consisting of a rolling-mill motor F supplied with a current from a motor-dynamo D, M driven directly from the main source of current and provided with flying masses S, the electromotive force transmitted to the rolling-mill motor F being regulated by alteration of the field-magnet excitation of that part of the motor-dynamo (D, M, S) which generates the current for the rolling-mill motor.

In testimony whereof I have hereunto set my hand in the presence of two witnesses.

CARL ILGNER.

Witnesses:
   ING. M. FINZI,
   SOLOMAN V. KEREKZJADTO.